Jan. 6, 1942.    J. R. GOMERSALL    2,268,655
VOLTAGE CONTROLLED THERMAL TIMER
Filed Aug. 7, 1940    3 Sheets-Sheet 1
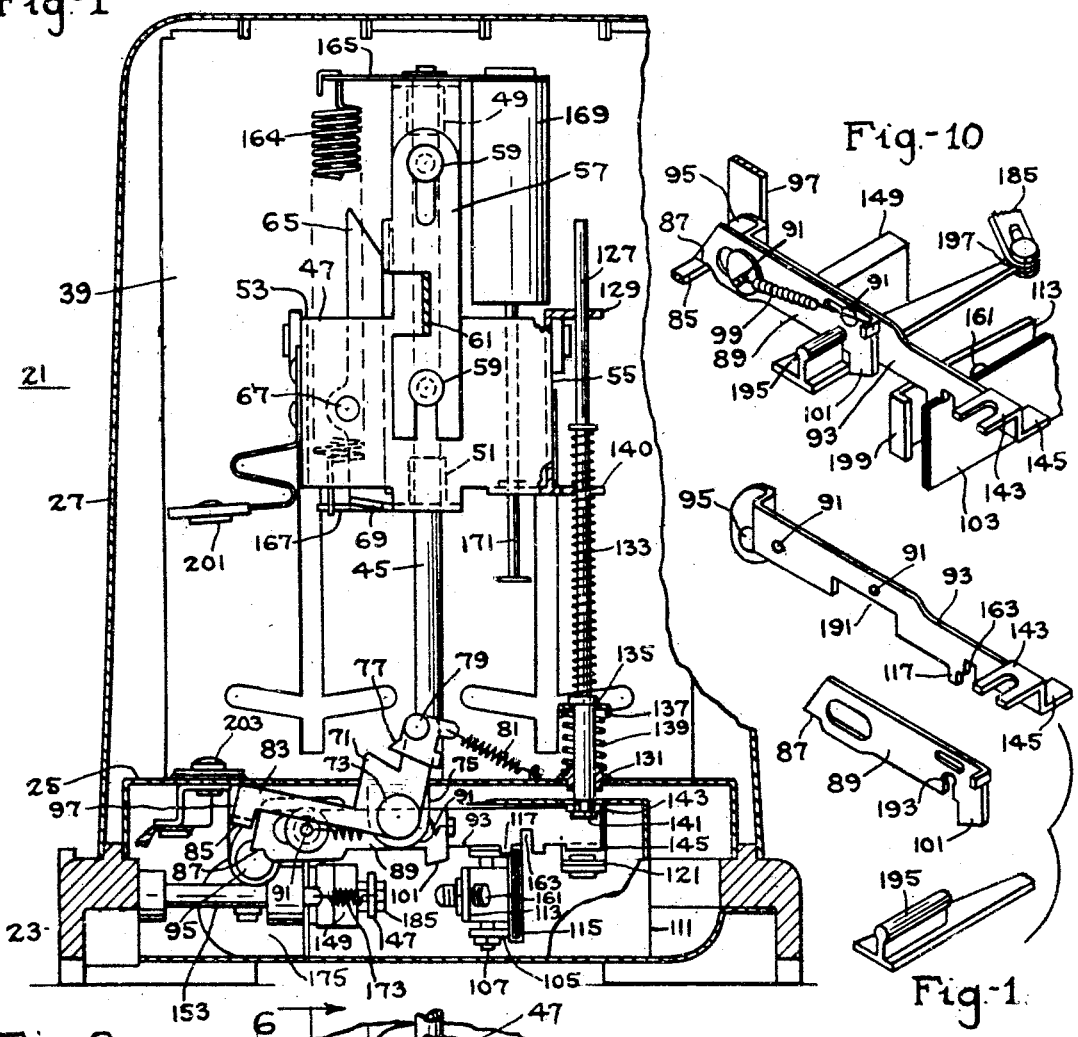
Inventor
John R. Gomersall
By H. M. Biebel
Attorney.

Jan. 6, 1942.                J. R. GOMERSALL                2,268,655
                     VOLTAGE CONTROLLED THERMAL TIMER
                       Filed Aug. 7, 1940          3 Sheets-Sheet 2
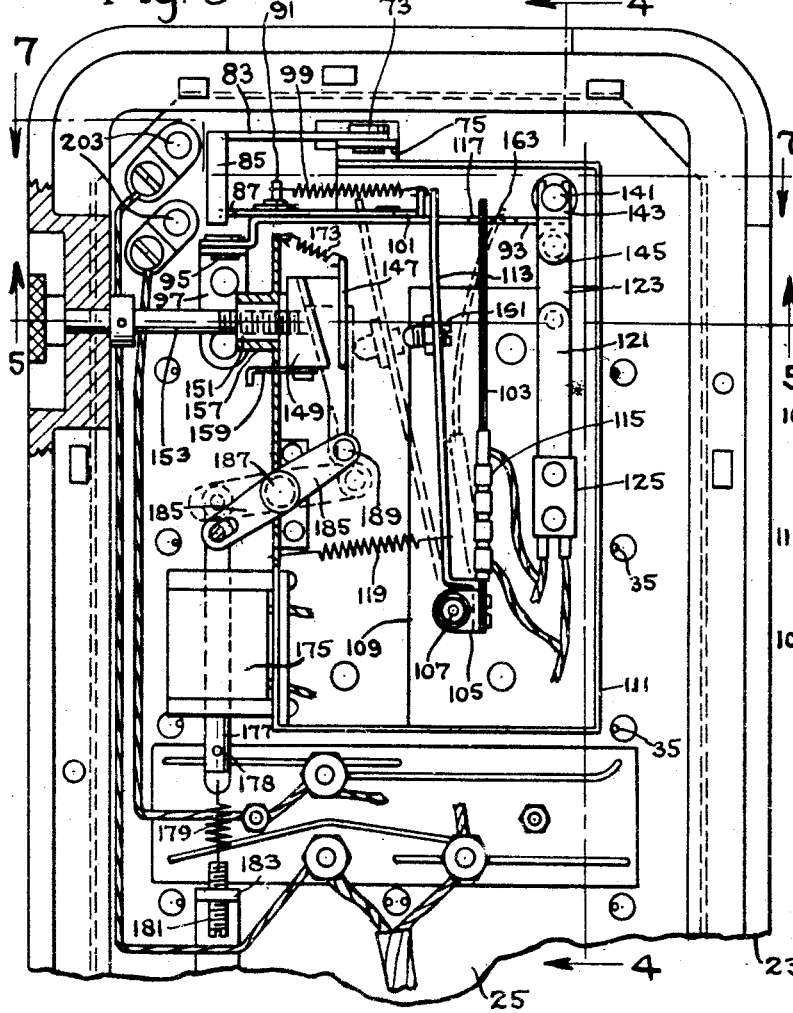
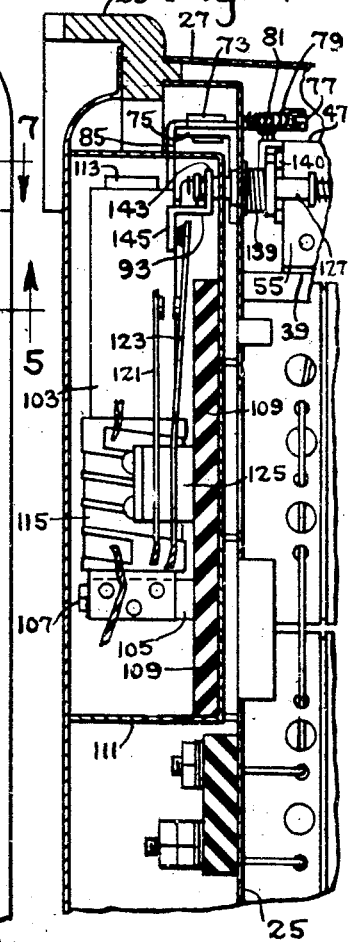
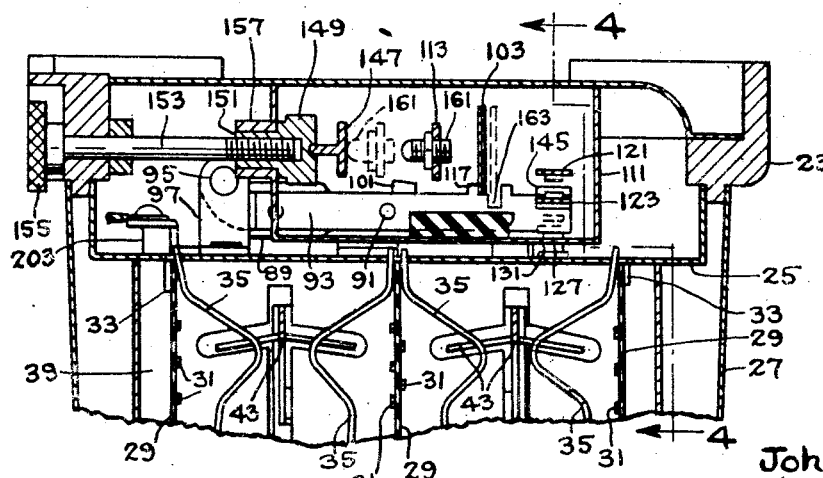
Inventor:
John R. Gomersall.
By H. M. Bielel
Attorney.

Jan. 6, 1942.  J. R. GOMERSALL  2,268,655
VOLTAGE CONTROLLED THERMAL TIMER
Filed Aug. 7, 1940   3 Sheets-Sheet 3
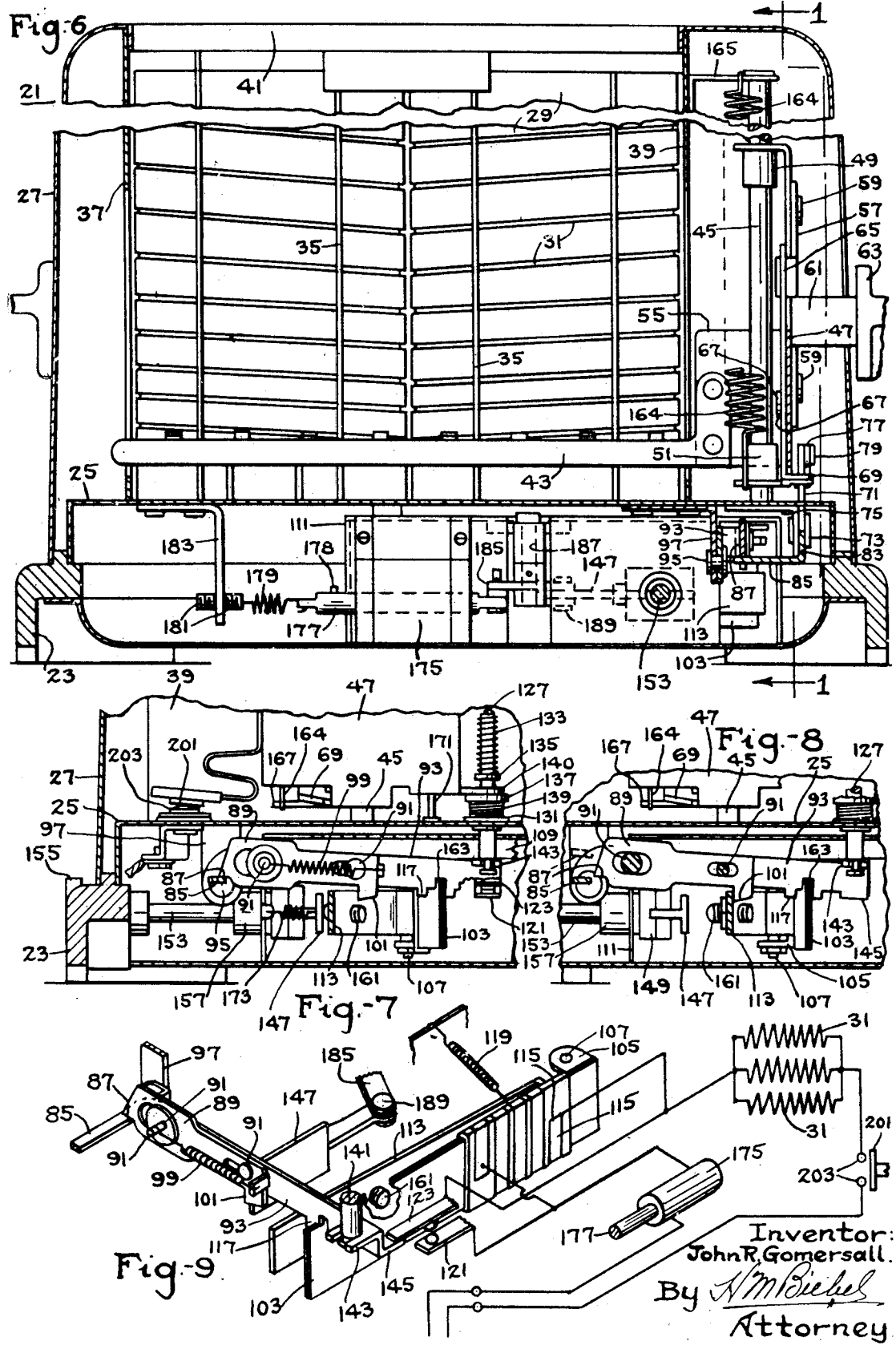
Inventor:
John R. Gomersall.
By N. M. Biebel
Attorney Patented Jan. 6, 1942

2,268,655

UNITED STATES PATENT OFFICE 2,268,655

VOLTAGE CONTROLLED THERMAL TIMER

John R. Gomersall, Minneapolis, Minn., assignor to McGraw Electric Company, Elgin, Ill., a corporation of Delaware Application August 7, 1940, Serial No. 351,673

8 Claims. (Cl. 219—19)

My invention relates to electric cooking appliances and particularly to automatic electric toasters.

An object of my invention is to provide a thermal timer, useful in automatic electric toasters, with voltage controlled means for varying the duration of operation thereof.

Another object of my invention is to provide an automatic electric toaster with voltage controlled means for counteracting the effect of abnormally low and of abnormally high supply circuit voltage.

Other objects of my invention will either be apparent from a description of one form of device embodying my invention or will be set forth in the course of such description and pointed out particularly in the appended claims.

In the drawings,

Figure 1 is a vertical lateral section through a toaster embodying my invention taken on the line 1—1 of Fig. 6, the parts being shown in non-toasting positions, Fig. 2 is a fragmentary view similar to Fig. 1 with the parts shown in the positions they will occupy at the beginning of a toasting period, Fig. 3 is a bottom plan view of the toaster with the rear portion broken away, all parts being shown in non-toasting positions by full lines and certain parts of the thermal timer being shown by broken lines in their operative positions at the end of the heat-up part of the cycle, Fig. 4 is a fragmentary vertical longitudinal sectional view on the line 4—4 of Figs. 3 and 5, all parts being shown in toasting positions, Fig. 5 is a fragmentary transverse vertical sectional view on the line 5—5 of Fig. 3, the parts being shown in the positions they will occupy at the beginning of a toasting period, Fig. 6 is a longitudinal vertical sectional view taken on the line 6—6 of Fig. 2, the parts being shown in the positions they will occupy at the beginning of a toasting period and also during the toasting period, Fig. 7 is a fragmentary transverse vertical sectional view on the line 7—7 of Fig. 3, showing the parts in their operative positions at a particular point of time during the operating cycle, Fig. 8 is a fragmentary sectional view similar to Fig. 7 showing certain parts in somewhat different positions occupied by them during another period of the operation of the device, Fig. 9 is an isometric schematic wiring diagram including certain parts of the device all shown in non-operating positions, Fig. 10 is an isometric view of a modified form of a part of the thermal timing means, Fig. 11 is an exploded view of the parts shown in Fig. 10, and, Fig. 12 is a front elevational view of the parts shown in Figs. 10 and 11 certain of the parts being shown in section.

An automatic electric toaster designated generally by the numeral 21 includes a bottom frame 23 which may be of skeleton construction and be made of moulded composition material. A bottom plate 25 of inverted box shape is secured against the upper surface of the skeleton frame 23 in any suitable or desired manner. The toaster includes a suitable outside casing 27 which may be secured against the upper surface of frame 23 in any suitable or desired manner.

I may here point out that the major portion of the general details of construction of the toaster and of the thermal timer are disclosed and claimed in my copending applications Ser. No. 328,828 filed April 10, 1940, and Ser. No. 328,-829 filed April 10, 1940, and assigned to the same assignee as is the present application. This specification will describe the details of construction of the toaster and of the thermal timer only to the extent that it appears necessary to do in order to fully describe the improvement added thereto which is particularly disclosed and claimed in the instant application.

I have elected to show my invention as applied to a two-slice toaster which includes three planar vertically-extending electric heating elements, each element including one or more sheets 29 of electric-insulating material, such as mica, on which is wound a wire or strip of resistor 31. The lower edges of the mica plates may be held in any suitable or desired position but as shown, for instance, in Fig. 5 of the drawings, they are held by upwardly vertically-extending lugs 33 punched out of the bottom plate 25 and by the lower end portions of guard wires 35 which guard wires are suspended from any suitable or desired supporting means from the top portion of the toaster. I provide also a rear intermediate wall 37 and a front intermediate wall 39 which may cooperate with the bottom plate and parts of the outer casing to provide one or more toasting chambers. The upper wall of the outer casing is provided with a number of bread-receiving and toast-removing openings 41, the number of these openings corresponding, of course, with the number of slices of bread which it is possible to toast simultaneously in the toaster.

Supporting means for a slice or slices of bread may include a bread carrier 43 one of each of which is positioned between a spaced pair of vertically-extending electric heating elements and the bread carriers are mounted, as will be set forth later, for vertical movement upwardly into a non-toasting position and downwardly into toasting position and reference to Fig. 6 of the drawings will show a bread carrier in its lowered or toasting position. The front and rear end portions of each carrier extend through the front and the rear intermediate walls and this serves to hold the carrier in properly aligned position between the spaced toast heating elements.

A vertical standard 45 is positioned in front of the front intermediate wall 39 and has mounted thereon a carriage plate 47 which is of generally channel shape and provided with an upper bushing 49 and a lower bushing 51 adapted to move on the vertical standard. The carriage 47 is provided with a left-hand rearward extension 53 and a right-hand rearward extension 55 which are adapted to be connected respectively to the two bread carriers when two such carriers are provided. A vertical bar 57 is supported by and in front of the plate 47 as by a pair of pins 59 fitting into slots in member 57 whereby it is possible for member 57 to be moved vertically relatively to plate 47. Member 57 is provided with a forwardly-projecting portion 61 extending outwardly through the front wall of the outer casing 27, which portion 61 has an actuating knob 63 mounted thereon which may be pressed downwardly by an operator to start a toasting operation.

A latch bar 65 is pivotally mounted on the carriage 47 adjacent its inner face as by a pivot pin 67 positioned intermediate the ends of the latch bar 65. The latch bar 65 is provided at its lower end with a forwardly-extending angular projection 69 which is adapted to engage a detent to be hereinafter referred to.

Means for holding the carriage 47 and the latch bar thereon, as well as the bread carriers, in their lowered and toasting positions may include a detent member 71 of substantially L-shape and mounted on a pivot pin 73, which pivot pin is supported by a bracket 75 which is secured to the under face of plate 25. Detent member 71 has mounted thereon a latch-engaging member 77 which is pivotally mounted at the outer end of the upper arm of detent 71 by a pivot pin 79. A biasing spring 81 connected to member 77 biases this member and the detent in a clockwise direction under normal or inoperative conditions. The detent member 71 is provided with a second relatively longer arm 83 extending in a substantially horizontal direction which arm is provided at its outer end with a laterally-projecting portion 85 adapted to be engaged by a nose 87 on a detent engaging and releasing bar 89. This bar 89 is slidably mounted as by a pair of pins 91 on a pivotally mounted arm 93 this arm being pivotally mounted on a pin 95 supported by a bracket 97 which bracket is secured to the lower face of bottom plate 25. Member 89 is biased in a left-hand direction, as seen in Figs. 1 and 2 of the drawings, by a tension coil spring 99 so that under certain conditions when the detent is caused to turn in a counter-clockwise direction, as will be hereinafter described, projection 85 will be engaged by the nose 87 to hold detent 71 in its proper latch-engaging position, this position being that shown in Fig. 2 of the drawings. Member 89 is provided at its right-hand end (as seen in Figs. 1 and 2) with a depending nose 101 which has an angularly-extending lower edge for a purpose to be hereinafter set forth.

A thermal timing means for determining the duration of a toasting operation includes a thermobar 103 which has one end thereof secured to a pivotally mounted bracket 105 which may turn on a pivot pin 107, which pivot pin may be supported from a small plate 109 which is in turn secured against the lower face of the upper wall of a timer-containing casing 111 which may be secured in any suitable or desired manner against the under surface of bottom plate 25.

A rigid bar 113 which has a short lateral extension at one end thereof, extends substantially parallel to thermobar 103 and members 103 and 113 are rigidly secured together as shown in Fig. 3 of the drawings so that flexing movement of the bimetal bar 103, as will be hereinafter described, causes pivotal turning movement of rigid bar 113.

Thermobar 103 has insulatedly mounted thereon a small electric heater 115 which, when traversed by an electric current, will cause rise of temperature of bar 103 and bowing thereof into a position shown in the broken lines in Fig. 3 of the drawings, for the following reason. The free end of thermobar 103 normally is in engagement with the lower edge of the pivotally mounted bar 93 and is held against a small lug 117 (see Fig. 5) by reason of a small tension biasing spring 119 connected to one wall of the box 111 and to the rigid bar 113. It is evident that since one end of the rigid bar 113 is fixedly secured to the adjacent end of bimetal bar 103, flexing of bar 103, when heated, will cause this bar to turn in a counter-clockwise direction, an extreme position whereof may be that shown in the broken lines in Fig. 3 of the drawings.

Means for controlling the energization of the auxiliary heater 115 may include a substantially rigid contact arm 121 and a cooperating resilient contact arm 123 which is supported from a block 125 of electric insulating material. It is desired that the two contact bars 121 and 123 be out of circuit-closing position during normal or inoperative conditions and this is effected in the following manner. A vertically-extending rod 127 has its upper end projecting through an opening in an extension 129 secured to or constituting a part of carriage plate 47. The lower end of this rod 127 may move through a bushing 131 in the bottom plate 25. A normally open compression coil spring 133 surrounds the rod 127, the upper end of this spring being adapted to be engaged by extension 129 when the same is moved downwardly by an operator to start a toasting operation. A fixed collar 135 is mounted on the rod 127, near the lower end thereof but above the bottom plate 25, and the lower end of spring 133 rests thereon. A loose washer 137 is positioned immediately below collar 135 and is normally held against the collar by a short compression spring 139 surrounding rod 127, the lower end of spring 139 resting on bushing 131. A slotted extension 140 at the lower right-hand corner of carriage 47 is adapted to engage washer 137 to effect compression of the spring 139, when the carriage is moved downwardly to start a toasting operation, whereby the normal initial upward bias of rod 127 is overcome.

The lower end of rod 127 extends through bushing 131 in bottom plate 25 and slightly below it and has a headed lower end 141 of reduced diameter, the part of reduced diameter fitting into a recess in a projection 143 extending laterally of bar 93 at its end so that movement of rod 127 will be accompanied by turning movement of the bar 93 as will be hereinafter described.

Bar 93 is further provided at its right-hand end with a second laterally-extending projection 145 (as seen in Fig. 9) which is positioned below the free end of contact bar 123. When the parts of the toaster are in the positions shown in Fig. 1 of the drawings, rod 127 will be in its upper position so that projection 145 under contact arm 123 will hold this contact arm out of engagement with contact arm 121 so that upon energization of the toaster as by moving the carriage 47 downwardly to move the bread carriers into toasting position, spring 133 will be compressed as shown in Figs. 2 and 5 of the drawings, as will also the spring 139. However, turning movement in a clockwise direction of bar 93 is prevented because of the engagement of thermobar 103 against the lower edge of bar 93, these positions being shown in Fig. 2 of the drawings. Contacts 121 and 123 are moved into engagement with each other in a manner to be hereinafter set forth.

It is desired to first cause heating of the thermobar 103 with bowing thereof to substantially the position shown by broken lines in Fig. 3 of the drawings with attendant turning movement, in a counter-clockwise direction, of rigid bar 113, and, at a predetermined temperature, to prevent further turning movement of bar 113. For this purpose I provide a stop member 147, which, as shown in Fig. 5 of the drawings, may be a bar of substantially T-shape in lateral section, which bar has an outer flat surface, as shown in Fig. 5 of the drawings, while the edge of the stem of the member of T-shape is of angular shape as shown in Fig. 3 of the drawings and is adapted to fit into a slot in an angularly-extending adjustable member 149. This member has its other end 151 of rod shape and has a screw-threaded opening therethrough engaged by the screw-threaded end of a rod 153 which rod may be turned by a knob 155 mounted thereon outside of the skeleton frame 23. The box member 111 has a bearing sleeve 157 secured thereto (see Fig. 3) to surround portion 151 of member 149 so that when knob 155 is turned by an operator, member 149 will be caused to move longitudinally of the supporting shaft 153 rotation of member 149 being prevented by a lug 159 or in any other suitable or desired manner.

Rigid bar 113 is provided with an adjustable stop screw 161 (see Fig. 3) which stop screw is adapted to engage the right-hand surface, as seen in Figs. 3 and 5, of member 147 so that upon further heating of thermobar 103, it will be moved into a recess 163 in bar 93 (see Fig. 8 of the drawings) whereby turning movement of bar 93 in a clockwise direction is permitted because of the action of the compression spring 133, the immediate result of this turning movement being the engagement of contact bar 123 with contact bar 121 to thereby deenergize the auxiliary heater 115 with resultant cooling of the bimetal bar 103. It is to be noted that projection 101 on bar 89 is initially out of the path of the counter-clockwise movement of rigid bar 113 because of the fact that bar 93 is in its upper position (see Figs. 2 and 5) but after bar 93 has been moved slightly downwardly in a clockwise direction (see Fig. 8) projection 101 will be in the path of the returning clockwise movement of rigid bar 113. Cooling of the bimetal bar 103 to a predetermined lower temperature will cause a reduction in the amount of bowing thereof and an accompanying clockwise turning movement of rigid bar 113 with the result that bar 113 will engage projection 101 and cause movement of the detent-releasing bar 89 so that projection 85 of the detent will be disengaged from nose 87. The bread carriers are normally yieldingly biased into their upper or non-toasting position by a tension coil spring 164 secured to a bracket 165 and to a projection 167 mounted respectively on the front intermediate wall and on the carriage 47. When carriage 47 has been moved to its lower position so that member 69 is in engagement with member 77 (see Fig. 2) the detent member 71 will be subjected to a force tending to cause it to turn in a clockwise direction when permitted to do so by disengagement of member 85 from the nose 87, as hereinbefore described. It is thus evident that when the thermobar 103 has been cooled to a predetermined lower temperature with attendant movement of detent-releasing bar 89 and release of detent 71 therefrom, that spring 163 will cause upward movement of the carriage and of the bread carriers connected thereto. I may provide an air cylinder 169 with a piston therein mounted on a rod 171 to act as a shock absorber whereby it is possible to use a relatively strong spring 164 to ensure quick upward movement of the bread carriers when permitted to do so but without undue shock to the toaster structure which, of course, in domestic devices of this kind is relatively light. It is evident that movement of stop member 147 which may be held in engagement with member 149 by a tension spring 173 will vary the temperature at which rigid bar 113 and particularly the adjusting screw 167 thereon, will engage stop member 147 and therefore will also vary the time required for such operation and this will, therefore, permit an operator to so adjust the thermal timer that he may obtain light, medium, or relatively dark toast, as may be desired. This is normally sufficient for the ordinary supply circuit voltage which may be considered to be substantially 115 volts but it may happen that a toaster of this kind is used in a district where the supply circuit voltage is abnormally low, say on the order of 100 to 105 volts. Again it may happen that a toaster of this kind is used in a district where the supply circuit voltage is abnormally high, say 120 or 125 or even more.

My invention particularly provides a means controlled in accordance with the supply circuit voltage whereby an immediate and automatic adjustment of the stop member 147 is made at the instant when the toaster is connected to the supply circuit for ensuring that the desired degree of toasting of a slice or slices of bread will be obtained irrespective of whether the supply circuit voltage is normal, abnormally low or abnormally high.

This means includes an electromagnetic device comprising a coil 175 which is connected in series circuit relation relatively to the toast heating elements and to the auxiliary heater 115 so that the amount of movement of an armature core 177 will be substantially in proportion to the current traversing the coil 175. One end of armature core 177 is connected to a biasing spring 179 (see Fig. 3) which spring has one end connected to a manually adjustable screw 181 carried by a small bracket 183. It is thus evident that normally core member 177 will be drawn by spring 179 in a given direction and that core member 177 will be caused to move in the opposite direction when coil 175 is traversed by an electric current. A pin 178 may be secured in the outer end of core 177 to limit the amount of movement thereof caused by its magnetic energization by the coil 175 when carrying current. The position of pin 178 is, of course, such that the core may move through the desired distance in its operation.

The other end of core 177 is mechanically and pivotally connected to a double arm lever 185 pivotally mounted on a fixed pin 187, the other end of lever 185 being connected with stop member 147 by a pivot pin 189.

The design and construction of this electromagnet control of stop member 147 is such that normally armature core 177 occupies the position shown in full lines in Fig. 3 of the drawings so that the lever arm 185 is in the position shown by the full lines, and member 147 occupies a position nearer the front end of the toaster so that the distance between adjusting screw 161 and the face of stop member 147 engaged thereby is a maximum. However, upon energization of the toaster and therefore also of coil 175 by say a voltage of 125 volts, core 177 will be drawn into the coil 175 to cause clockwise turning movement of lever arm 185 to the position shown in broken lines in Fig. 3 of the drawings with the resultant movement of stop member 147 away from the front end portion of the toaster so that the initial distance between adjusting screw 161 and the surface of stop member 147 will be less. It is evident that under these conditions the temperature to which the bar 103 must be heated to cause engagement of screw 161 on bar 113 with the stop member 147 will be lower, that is, it will require a shorter time to heat up the thermobar to the temperature at which it will cause deenergization of the auxiliary heating element carried thereby and it is further evident that a lesser time will be required for the thermobar to cool to the temperature at which release of the latch on the carriage is effected with the resultant termination, as hereinbefore described, of a toasting operation.

The above described electromagnetically-actuated means responsive to the voltage of the supply circuit is effective on the heat-up part of the cycle of operation of the thermal timing means, but it may be made effective on the cool-off part of the cycle and a modified form of timer structure will now be described effective for that purpose.

Referring to Figs. 10, 11 and 12 of the drawings, I have illustrated certain parts of the thermal timing means which have been modified or added. The pivotally supported arm 93 is provided with a recess 191 in one edge and the slidable bar 89 is provided with a recess 193 in its lower edge, which recess is enlarged at its inner portion. A wedge-shaped member 195 is adapted to be slidably suspended in recess 193 by an upper portion adapted to fit loosely in the recess to suspend member 195 adjacent to nose 101. Member 195 is provided with an eye 197 to permit of mechanically connecting it with one arm of lever 185 to be moved by the energized coil 175. Rigid bar 113 may be provided with a lateral projection 199, the tip end of which is adapted to engage a point on the sloping side of member 195 to press it against depending nose 101 to cause the detent release bar 89 to move and be disengaged from projection 85.

The inoperative position of wedge member 195 is that where the thinnest part of the wedge is adjacent to member 101. When the toaster is energized from an abnormally low voltage supply circuit, the wedge member is moved but slightly to bring a somewhat thicker part of the wedge adjacent the nose 101. It will therefore require a given time for the bimetal bar 103 to cool sufficiently to cause projection 199 to engage 195 and effect releasing movement of bar 89.

If the toaster is connected to a high voltage source of supply the coil 175 will act to cause wedge member 195 to be moved through a greater distance so that a much thicker part of the wedge 195 is alined with nose 101 and the time for bimetal bar 103 to cool sufficiently to cause projection 199 to engage member 195 and effect releasing movement of bar 89 will be much less. The higher voltage applied to the toast heating elements will, of course, cause toasting of a slice or slices of bread to a given degree in a shorter time than if the toast heating elements were energized from a lower voltage and hence the action of the electromagnetic timer control means correlates the thermal timing means to the operation of the toast heating means.

It is, of course, to be understood when member 147 is used on the heat-up part of the cycle of operation of the thermal timer, the member 195 and its associated parts are not used and conversely.

It is to be noted also that the exact details and dimensions of the wedge member moved by the magnet coil and core may vary from those shown in the drawings and it is to be understood that proper adjustments will be made of the cooperating parts to obtain the desired results.

When the adjustable wedge member 195 is used on the cool-off part of the cycle, it is possible to manually adjust stop member 149 to control the length of time of the heat-up part of the cycle of the timer, so that both parts of the cycle may be controlled whereby a relatively large change in the voltage applied to the toaster can be easily and adequately counteracted or compensated. It is, therefore, possible to obtain the same degree of toasting of similar slices of bread in a toaster embodying my invention irrespective of the voltage of the supply circuit and any desired different degree of toasting can be obtained by use of the manually-actuable timer-adjusting means actuated by knob 155.

Means for controlling the current flow through the toaster may include a contact bridging member 201 insulatedly and resiliently supported on carriage 47 and two contact members 203 insulatedly supported on bottom plate 25.

It may be here pointed out that the thermal timer is provided with an electromagnetically actuable voltage-controlled means whereby the duration provided by the thermal timer may be easily and quickly automatically adjusted and it is to be further noted that the electromagnetic or voltage controlled means is immediately effective, that is, it becomes operative as soon as the toaster is connected to a supply circuit and the toaster control switch is closed, and that further it will respond to changes in the supply circuit voltage during the heat-up part of the time cycle of operation of the thermal timer.

Various modifications may be made in the device embodying my invention as shown in the accompanying drawings, without departing from the spirit and scope thereof and I therefore desire that all modifications clearly coming within the scope of the appended claims shall be considered to be covered thereby.

I claim as my invention:

1. In an automatic electric toaster comprising electric toast heating elements, a bread carrier movable into toasting and non-toasting positions relatively to the toast heating elements and normally yieldingly biased to non-toasting position, means to move the bread carrier to toasting position, latch means to hold the bread carrier in toasting position and means to cause release of said latch after a toasting operation, said latch release means including a variable-duration thermal timing means including a thermally-actuable element adapted to be heated up and then cooled off during a toasting operation, means in said timing means for varying the duration of the heat-up portion of the cycle to vary the duration of a toasting operation and electromagnetic means subject to the voltage applied to the toast heating elements to reduce the duration of the heat-up portion of the cycle of the thermal timing means and also reduce the duration of a toasting operation with increase in the voltage applied to the toast heating elements.

2. In an automatic electric toaster comprising electric toast heating elements, a control switch therefor normally yieldingly biased to open position, means to cause closing of said switch to initiate a toasting operation, latch means to hold said switch closed and means to cause release of said latch to terminate a toasting operation after a time interval including a variable-duration thermal timing means including a thermally-actuable element adapted to be heated up and then cooled off during a toasting operation, means in said timing means for varying the duration of the heat-up portion of the cycle to vary the duration of a toasting operation and electromagnetic means subject to the voltage applied to the toast heating elements to reduce the duration of the heat-up portion of the cycle of the thermal timing means and also reduce the duration of a toasting operation with increase in the voltage applied to the toast heating elements.

3. In an automatic electric toaster comprising toast heating elements, means to initiate a toasting operation and means to terminate a toasting operation including a thermal timing means including a thermally-actuable element adapted to be heated up and then cooled off during a toasting operation, the improvement comprising an electromagnet energized in accordance with the voltage applied to the toast heating elements and means actuable thereby to vary the duration of the heat-up part of the cycle of the timing means to ensure substantially uniform toasting of successive slices of bread irrespective of the value of the voltage applied to the toast heating elements.

4. In an automatic electric toaster comprising toast heating elements, means to initiate a toasting operation and means to terminate a toasting operation including a thermal timing means including a thermally-actuable element adapted to be heated up and then cooled off during a toasting operation, the improvement comprising an electromagnet energized in accordance with the voltage applied to the toast heating elements and means actuable thereby to vary the duration of the cool-off part of the cycle of the timing means to ensure substantially uniform toasting of successive slices of bread irrespective of the value of the voltage applied to the toast heating elements.

5. In an automatic electric toaster comprising toast heating elements, means to initiate a toasting operation and means to terminate a toasting operation including a thermal timing means including a thermally-actuable element adapted to be heated up and then cooled off during a toasting operation, the improvement comprising manually-actuable means to vary the duration of the heat-up part of the cycle and electromagnetic means subject to the voltage applied to the toast heating elements for varying the duration of the cool-off part of the cycle to increase the duration of the cool-off part of the cycle with decrease in the voltage applied to the toaster.

6. In an automatic electric toaster comprising toast heating elements, means to initiate a toasting operation and means to terminate a toasting operation including a thermal timing means including a thermally-actuable element adapted to be heated up and then cooled off during a toasting operation, the improvement comprising manually-actuable means to vary the duration of the heat-up part of the cycle and electromagnetic means subject to the voltage applied to the toast heating elements for varying the duration of the cool-off part of the cycle to decrease the duration of the cool-off part of the cycle with increase in the voltage of the supply circuit to which the toaster is connected.

7. In an automatic electric toaster comprising toast heating elements, means to initiate a toasting operation and means to terminate a toasting operation, said terminating means including a thermal timing means comprising a thermally-actuable element adapted to be heated to a given high temperature and then to be cooled to a given lower temperature to fix the duration of a toasting operation and electromagnetic means subject to the voltage applied to the toast heating elements for causing a change in the value of one of the temperatures attained by said thermally-actuable element to cause a change in the time required for the thermally-actuable element to reach said temperature and thereby cause a change in the duration of a toasting operation in accordance with changes in the voltage applied to the toast heating elements.

8. In an automatic electric toaster comprising toast heating elements, means to initiate a toasting operation and means to terminate a toasting operation, said terminating means including a thermal timing means comprising a thermally-actuable element adapted to be heated to a given high temperature and then to be cooled to a given lower temperature to fix the duration of a toasting operation, means to heat the thermal element to a given high temperature, means actuated by the thermal element to stop heating of the thermal element when it has reached said given high temperature, means actuated by the thermal element when it has cooled to a given low temperature to stop a toasting operation and electromagnetic means subject to the voltage applied to the toast heating elements for causing one of said stop means to be actuated at another than said given temperature to ensure substantially uniform toasting of slices of bread irrespective of different supply circuit voltages applied to the toast heating elements.

JOHN R. GOMERSALL.